United States Patent Office

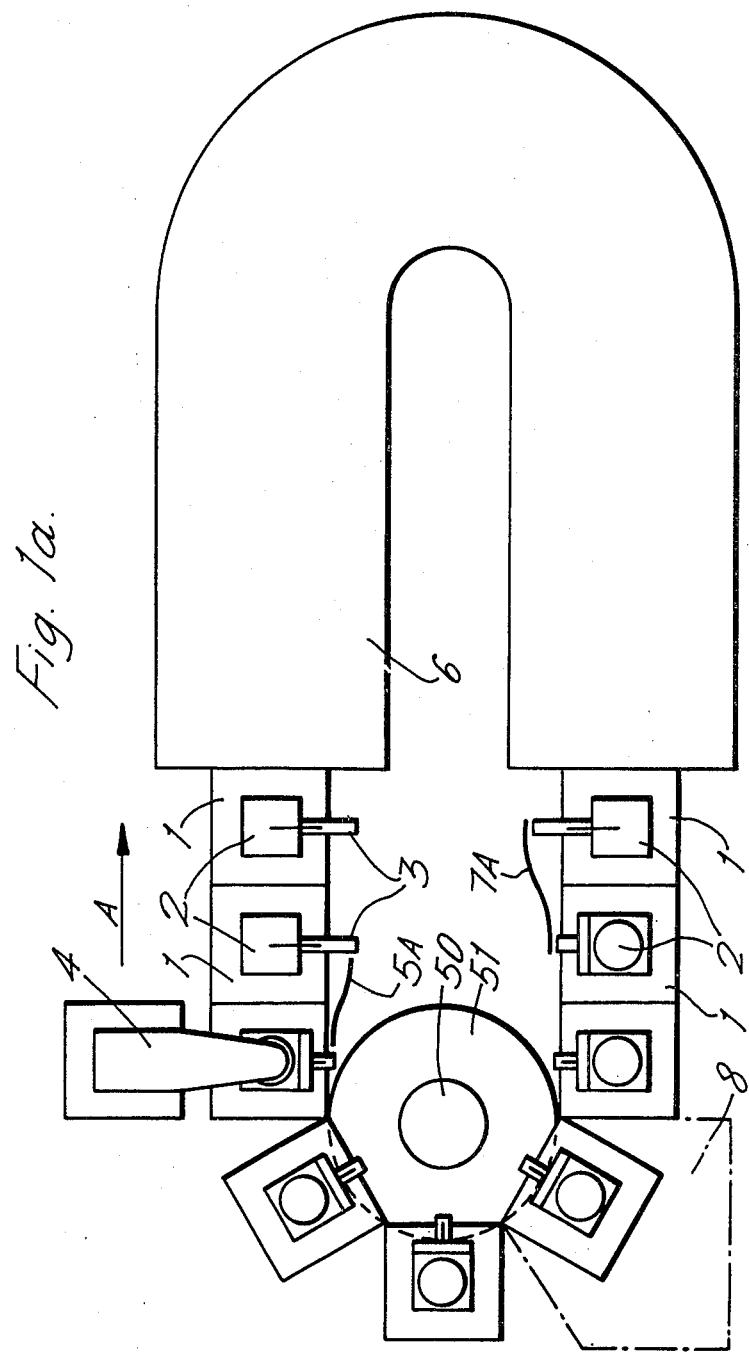

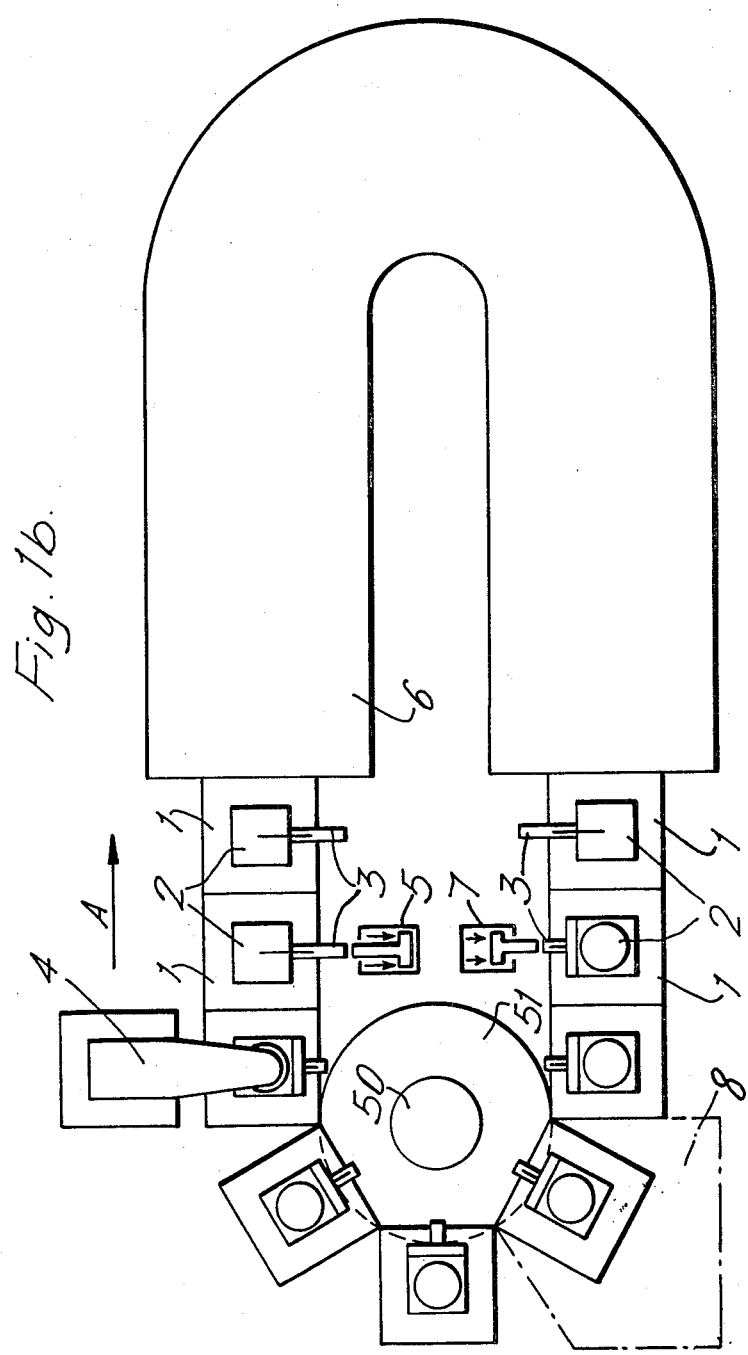

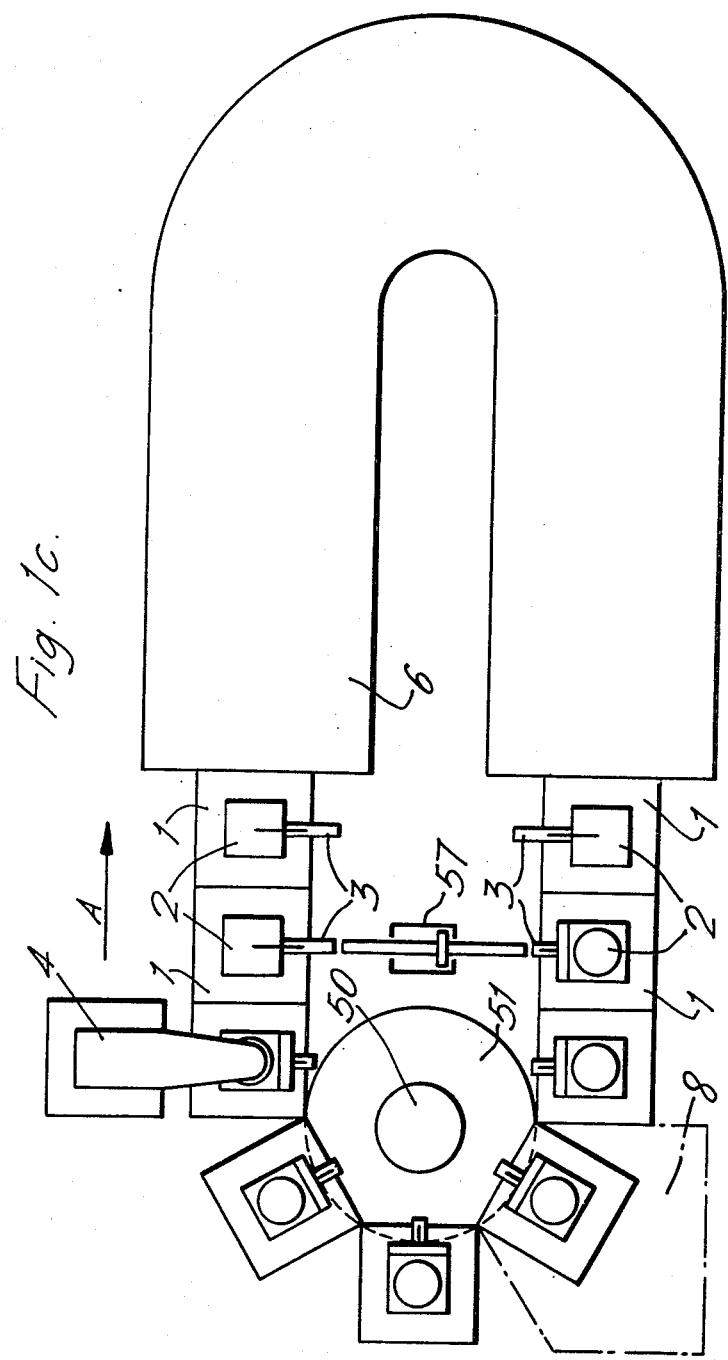

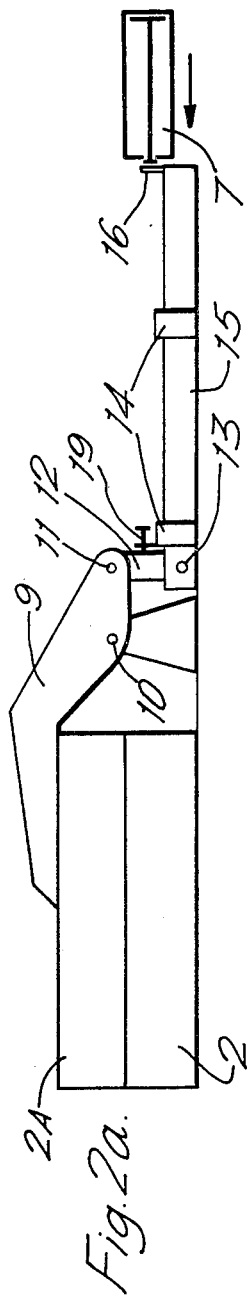
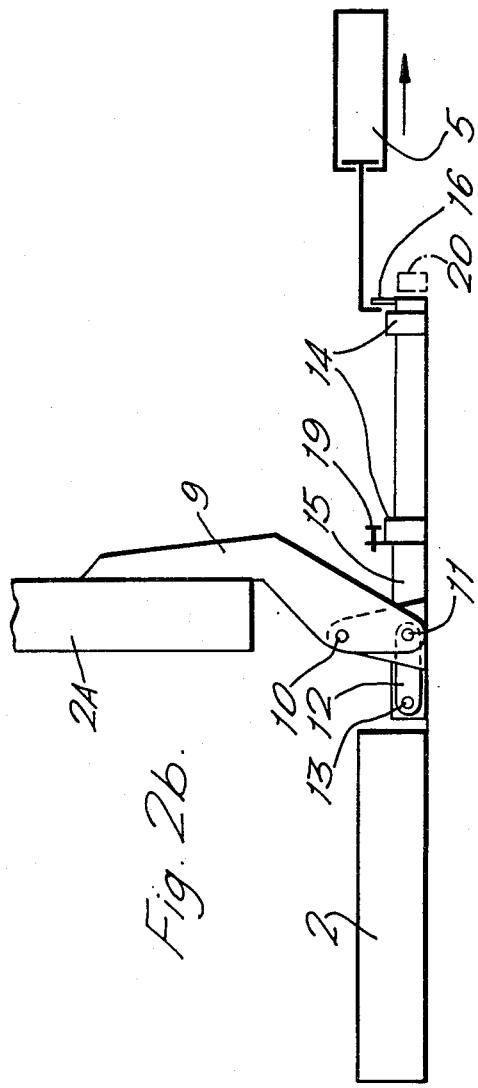
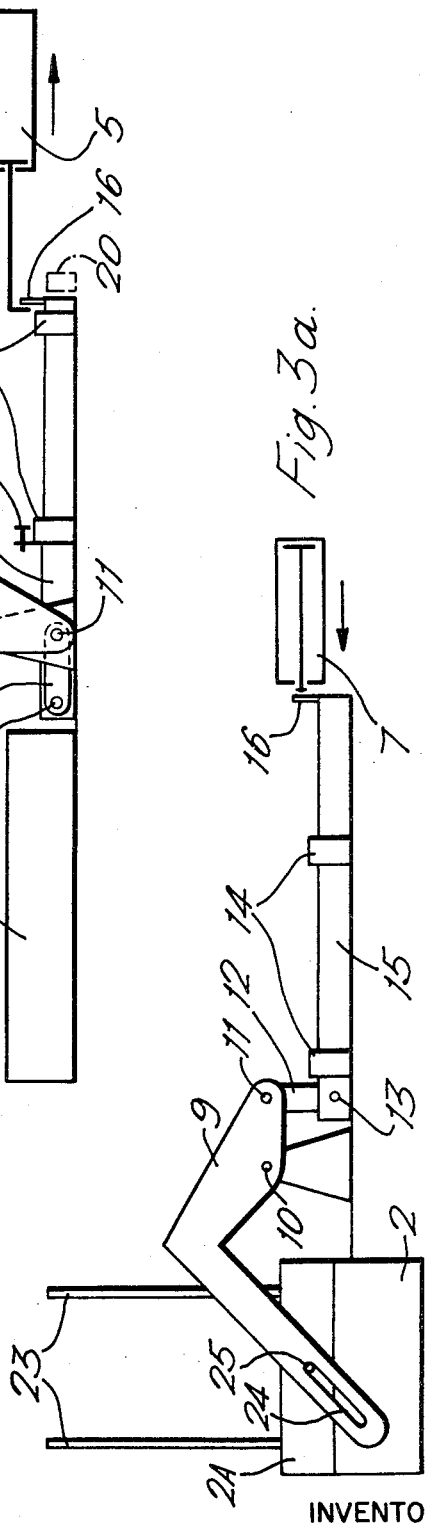

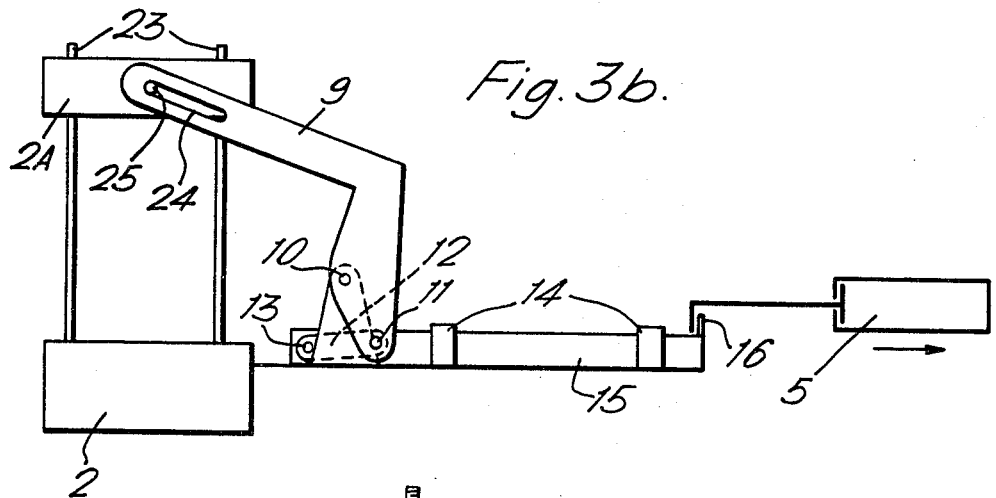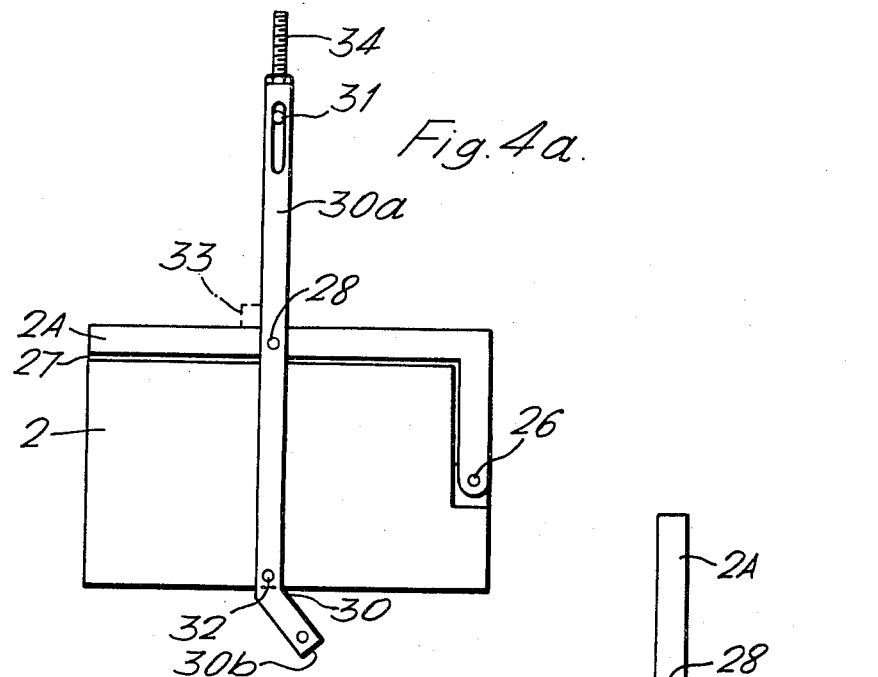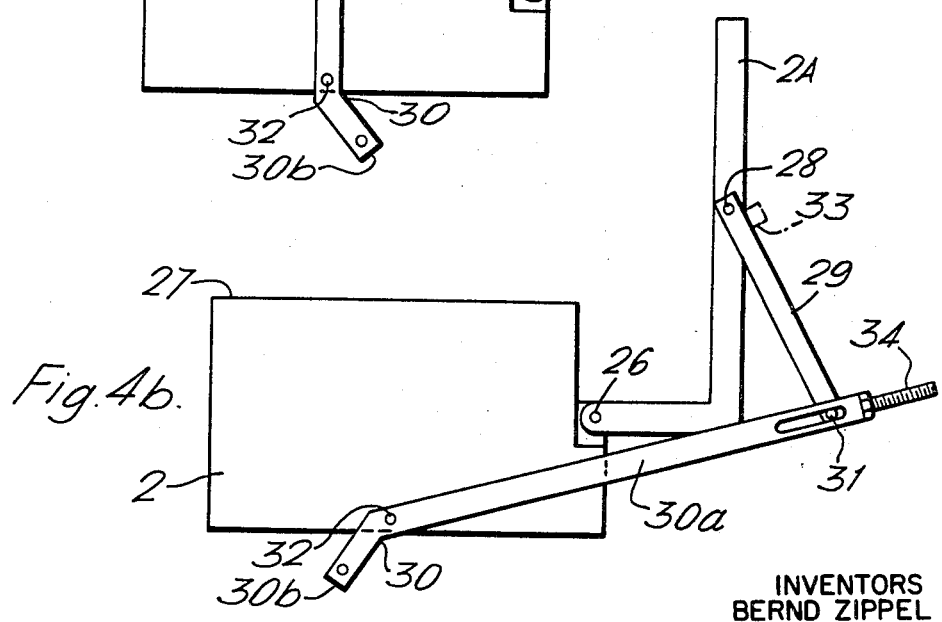

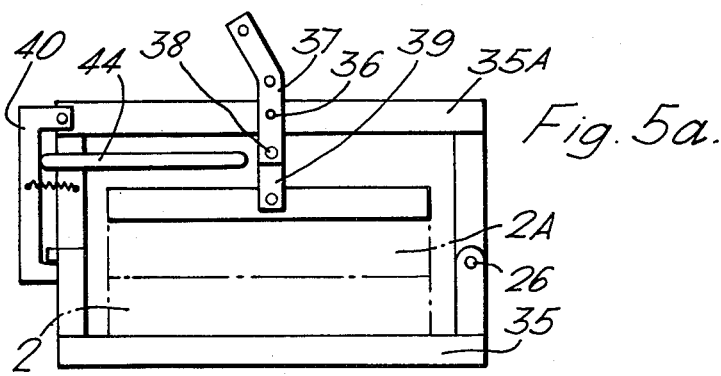
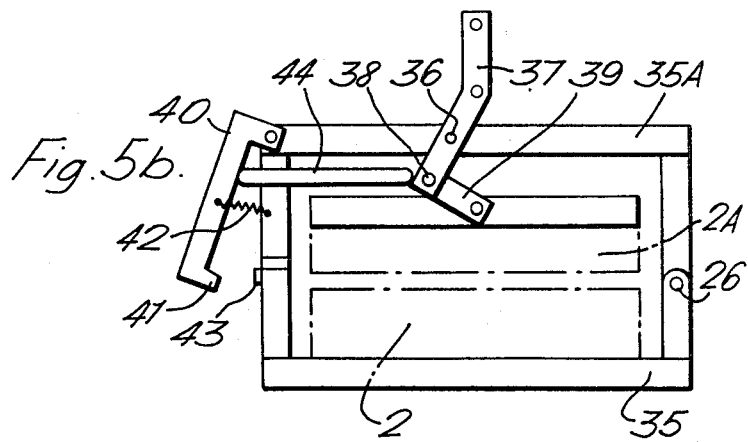
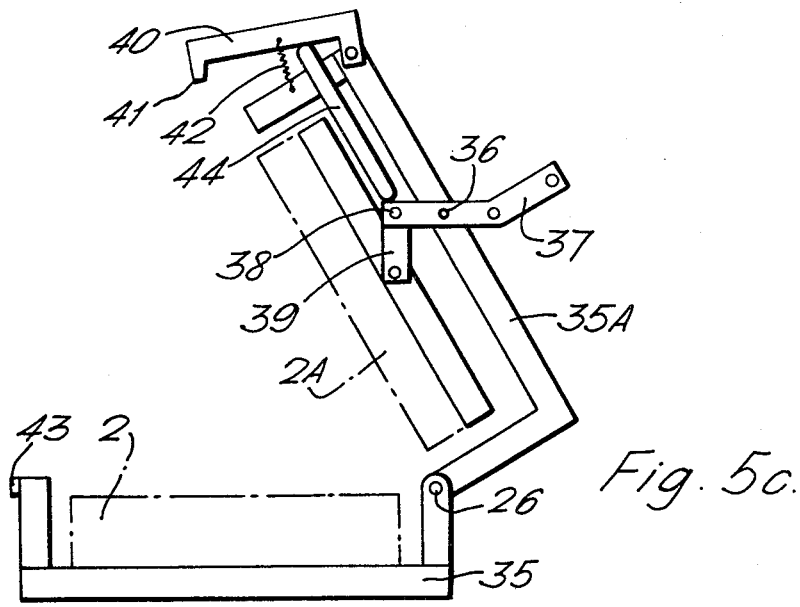

3,669,595
Patented June 13, 1972

3,669,595
MOULDING APPARATUS
Bernd Zippel, Langenhain, and Alfred Schlieckmann, Eschwege, Germany, assignors to Richard Zippel & Co. KG, Eschwege, Germany
Filed Feb. 20, 1970, Ser. No. 12,968
Claims priority, application Germany, Feb. 22, 1969, P 19 09 050.7
Int. Cl. B29c 3/02
U.S. Cl. 425—188
19 Claims

ABSTRACT OF THE DISCLOSURE

A mould processing arrangement for a multi-component plastics material moulding plant is disclosed. The arrangement comprises a number of moulds mounted on an endless conveyor and each of the moulds is provided with a self-locking mould closure and an associated opening and closing mechanism, which is operated by means of an actuating lever. The conveyor is intermittently driven so as to traverse each of the moulds successively through a mould filling station, a curing station and a mould removal station. A pair of mould closure actuating devices are located adjacent the conveyor. The first of these devices is located down-stream of the filling station and is arranged to engage the actuating levers of successive mould closures so as to close and lock the respective moulds. The second actuating device is located up-stream of the removal station and is arranged to engage the actuating levers so as to open each mould before it reaches the mould removal station.

BACKGROUND OF THE INVENTION

The present invention relates to improvements in mould processing arrangements, especially to improvements in a mould line within a plant for processing multi-component or foaming plastics fed in a liquid or semi-liquid state into open moulds.

Plastics are made into consumer articles by processing them in split moulds. With thermoplastic materials the moulds must be closed at a very high pressure in order to enable the plasticized thermoplastic compound to be injected into the mould under high pressure. Machines for producing consumer articles of thermoplastic compounds therefore incorporate a high-pressure mould.

When processing multi-component and foam plastics the pressures generated inside the mould are not as high as when processing thermoplastic compounds. For this reason the moulds used in this case are of lighter construction, and their closing mechanisms are designed for lower closing forces. It is possible to feed the moulds individually into the filling machine, to fill them, to withdraw them immediately afterwards from the filling machine and to close them.

In view of this possibility, it has been proposed to provide mould lines in the form of circulating conveyor belts or rotary carriers on which the moulds are mounted and introduced open into the mould filling unit where they are filled. They are then closed immediately after their withdrawal. These closed moulds are then moved onward by the conveyor system, in certain cases through heating zones, in order to accelerate the curing of the plastic material in the mould. A mould line of this nature is provided with a removal station in which the moulds are opened and the moulded articles are removed from the mould. The moulds used in such mould lines have, up to now, been individually closed by hand. In general, mould closures are used for this purpose which engage four points of the mould and press the two mould sections or mould halves together.

In view of the great number of existing moulds, the use of hydraulic or pneumatic mechanisms for closing the mould and for keeping it closed is a very costly matter. It increases the price of a plant to such an exent that the plant can no longer operate profitably, since a closing mechanism in the form of a hydraulic or pneumatic ram must be provided for each mold. In addition, follow-up control units have to be provided for these mechanisms. For this reason the trade has decided against building such plants on a larger scale, particularly since a mould filling plant must, in accordance with the output volume, produce one set of mouldings every three to thirty seconds, this requires a long mould line with numerous moulds because the plastic material, after having been ejected into the mould, must remain in the closed mould for some considerable time until it has hardened.

SUMMARY OF THE INVENTION

According to the present invention there is provided a mould processing arrangement for a multi-component plastics material moulding plant comprising an endless conveyor, a plurality of mould portions mounted on the conveyor, mould closure means for each of the mould portions, each of the mould closure means comprising a closure actuating member and being self-locking when closed, an intermittently operable mould filling station, a mould removal station, drive means to drive the conveyor to intermittently displace the mould portions past the mould filling station and towards the removal station, and closure closing means located down-stream of the mould filling station, the closing means engaging the actuating members to close and lock the mould closure means of successive mould portions.

Preferably, the arrangement comprises closure opening means located intermediate the closing means and the removal station, the opening means engaging the actuating members to unlock and open the mould closure means of successive mould portions.

Preferably, the closing means and the opening means each comprise a respective stationary arcuate cam member mounted adjacent the conveyor and engaging the actuating members during the intermittent displacements of the mold portions.

Alternatively, the closing means and the opening means each comprise a displaceable piston, each of the pistons being displaceable in response to fluid pressure to engage the respective actuating members of successive mould portions.

The closing means and the opening means may comprise a single piston reciprocally displaceable within a cylinder in response to fluid pressure to engage the actuating members of successive pairs of the mould portions. The hydraulic fluid required for opening and closing the moulds, when using hydraulic rams, may be supplied from the hydraulic fluid source during periods when the conveyor is stationary. Thus, demands on the hydraulic fluid source can be reduced to a low level.

In some applications, it is preferred to provide a guide rail between the stationary arcuate cam member or the piston pressing the actuating member into the open position and the stationary arcuate cam member or the piston forcing the actuating member into the closing position, this rail serves to prevent any accidential movement of the actuating member while the mould is open. The mould cover portion may be slide-mounted in a guide for displacement perpendicularly to respective mould portions. Thus, the cover portion is not moved about a pivot but is fitted into the respective mould portion by means of a displacement directed parallel to itself, so that even extremely complex moulds can be opened and closed in this manner without strain or damage at the interface between the respective co-operating mould portions.

BRIEF DESCRIPTION OF THE DRAWINGS

Embodiments of the present invention will now be described, by way of example, with reference to the accompanying drawings, in which:

FIG. 1a shows a plan view of a mould line embodying the invention in which the moulds are unlocked and opened as well as locked and close via stationary arcuate cam members;

FIG. 1b shows a plan view of a mould line in which one piston is provided for unlocking and opening the moulds and a second piston is provided for locking and closing the moulds;

FIG. 1c shows a plan view of a mould line in which a single piston is used both for unlocking and opening and for closing and locking the moulds;

FIG. 2a shows a level-type mould closure means in the closed position;

FIG. 2b shows a lever-type mould closure means for low capacity moulds in the open position;

FIG. 3a shows another lever-type mould closure means in the closed position;

FIG. 3b shows the lever-type mould closure means of FIG. 3a in the open position;

FIG. 4a shows a lever-type mould closure means for large capacity moulds in the closed position;

FIG. 4b shows the lever-type mould closure means of FIG. 4a in the open position; and FIGS. 5a to 5c show a further lever-type mould closure means in closed, open and intermediate positions, respectively.

DESCRIPTION OF THE PREFERRED EMBODIMENTS

The mould lines of FIGS. 1a, 1b and 1c feature circulating plates 1 on which mould portions 2 are fixed. The circulating plates 1 are pivotally inter-linked to form a conveyor which engages drive wheel 51 mounted on a rotatable shaft 50. The shaft 50 is coupled to a motor (not shown) for displacing the conveyor intermittently. The moulds 2 can be opened and closed by means of lever-type actuating members 3.

FIG. 1a two stationary arcuate cam members which form control cams are shown by means of which the lever-type actuating members 3 are operated. This arrangement is such that by means of a stationary arcuate control cam 7A each of the lever-type actuating members 3 is displaced to unlock and open the corresponding mould before that mould reaches the removal station 8, whilst by means of a stationary arcuate control cam 5A each of the lever-type actuating members 3 is displaced to close and lock each mould after it leaves the mould filling station. When arcuate profiled members forming stationary control cam with steep curvature are used, it is preferable to provide a rotatably mounted roller on each of the members 3 to engage the profile of the control cams.

Referring to FIG. 1b, a hydraulically displaceable piston or ram 5, which closes the moulds and is located downstream of the mould filling station 4, engages the lever-type actuating members 3 of each mould 2 as the moulds are conveyed towards the removal station 8. The direction of mould movement is indicated in FIGS. 1a and 1b by the arrows A. The moulds are passed through an infra-red furnace 6 and are opened by means of a hydraulically displaceable piston or ram 7, located upstream of the removal station 8, after the plastic material has cured.

In FIG. 1c, a single hydraulically operable piston or ram 57 serves for both unlocking and opening the moulds and also for closing and locking them.

FIGS. 2a and 2b show a lower capacity mould with its associated lever-type actuating mechanism for opening and closing the mould 2. In this embodiment, the cover portion 2A of the mould portion 2 is rigidly attached to a pivotable lever 9. The lever 9 is rotatably mounted about a pivot 10. Adjacent the free end of the lever 9, one end of a link 12 is articulated to a pivot 11. The other end of the link 12, is pivotally connected at 13 to a slide bar 15, which serves as actuating member for link 12. Slide bar 15 is slidably mounted in a guide 14 and forms the actuating member for the mould closure means. The pin 15, from which the mould unlocking and opening movement on the one hand and the mould closing and locking movement on the other hand are derived, moves in a rectilinear path so that the engaging locking mechanisms—in particular the stationary control cams 5A, 7A—can be designed in a particularly simple way. The slide bar is provided with a lug 16, which is engaged by the hydraulic rams for controlling the opening movement (hydraulic ram 7) and for controlling the closing movement (hydraulic ram 5).

In the closed position of the mould cover portion 2A, the link 12 is positioned approximately vertically and is thus disposed perpendicularly to the actuating slide bar 15. As a result, pivots 11 and 13 are approximately aligned with the downward force exerted on link 12 by any pressure in mould 2. This alignment is preserved until slide bar 15 is positively operated again; it is not disturbed by other operations, such as the travel of mould 2. A stop member 19 ensures that the bar 15 cannot shift without any external forces being applied. In the open position a guide rail 20, shown in FIG. 2b as a dotted line, may be located adjacent to the lug 16 in order to ensure that the open position of the mould cover portion 2A is maintained whilst the rail 20 remains so located.

FIGS. 3a and 3b show another arrangement of a lever-type actuating mechanism and mould closure means, which is similar to that shown in FIGS. 2a and 2b. Corresponding members in FIGS. 2 and 3 are denoted by the same references. As indicated in FIGS. 3a and 3b parallel guide bars 23 are provided to guide the mould cover portion 2A as it is open and closed. A slot 24 is provided in one end portion of the pivotable two-armed lever 9 in which a bar 25 is free to slide. The bar 25 is attached to the mould cover portion 2A.

In FIGS. 4a and 4b a mechanical self-locking lever-type actuating mechanism is provided, such a mechanism is particularly suitable for large capacity moulds. The mould cover portion 2A to be opened is pivotally attached to the remainder of the mould by pin 26, which is located underneath the mould interface or parting line 27. The mould cover portion 2A may be swivelled about this pin 26. With the aid of the centrally arranged pin 28, a link 29 is articulated to the mould cover portion 2A, the link 29 being linked to one arm 30a of the pivotable lever 30 with a pin 31. The lever 30 is pivoted to the fixed mould portion by means of a pivot pin 32, which is located below the mould interface 27. The hydraulic rams engage the free arm 30b and cause the mould portion 2 to be opened or closed. A stop member 33, shown as a dotted line, may be provided on the link 29 which ensures that the closed position is maintained. A bolt 34 is provided for adjusting the position of the pin 31.

Further mechanisms for setting the dead centre and for adaptation to various moulds may consist of mechanisms for displacing the pin 26 acting as a hinge, or in means for shortening one arm of the hinged mould section 2A.

FIGS. 5a, 5b and 5c show another arrangement of a mould closure means and of the associated actuating mechanism. The mould portions 2 and 2A are enclosed by a fixed support member 35 and a hinged support member 35A. At the pivot bearing point 36, an actuating lever 37 is pivotally connected to the hinged support member 35A, the lever 37 being pivotally connected at one end, by means of a pivot bearing 38, to one end of a link 39.

The respective other end of the link 39 is pivotally connected to the mould cover portion 2A. A displaceable plunger 44 is disposed in the path of movement of the actuating lever 37. The plunger 44 engages a pivoting locking member 40, which is subjected to the action of a spring 42 which tends to place the lug 41 of the bar 40 behind a projecting lug 43. The movable mould cover portion 2A is displaceable perpendicularly of the mould portion 2, via parallel guides not shown in the drawing. Thus, when the mould is opened, the movable mould cover portion 2A is first displaced perpendicularly to the mould portion 2, and the movable mould cover portion 2A then pivots about the hinge 26. In this way, the mould cover portion 2A is initially displaced perpendicularly to the mould portion 2 and is then swivelled in such a manner that, during the opening movement of the mould, a rigid mould filling unit can be positioned directly above the lower mould portion 2.

We claim:

1. A moulding plant for multi-component plastics material comprising, in combination:
    an endless conveyor;
    a plurality of moulds mounted on said conveyor for movement therewith through mould filling and article removal stations, and therebetween;
    a mould closure means carried by each of said moulds, each said mould closure means comprising a mould cover member, an actuating member displaceable to cause said mould closure means to open and close said mould, a link member interconnecting said actuating member and said mould cover member, a pair of mutually spaced pivot bearing means supporting said link members and which, on said mould being closed, are aligned in the direction of the force exerted on said link member due to any pressure within said mould, whereby said link member, in the closed position of the mould, locks the mould, thus making the closure means self-locking;
    mould closure closing means downstream of said mould filling station, said closing means engaging said actuating members to close and lock said mould closure means of successive ones of said moulds; and
    mould closure opening means intermediate said closing means and said removal station, said opening means engaging said actuating members to unlock and open said mould closure means of successive ones of said moulds.

2. A moulding plant as defined in claim 1, wherein said closing means and said opening means each comprise a respective stationary arcuate cam member mounted adjacent said conveyor and actuating said actuating members during said intermittent displacements of said moulds.

3. A moulding plant as defined in claim 1, comprising a source of fluid pressure and wherein said closing means and said opening means each comprise a displaceable piston, each of said pistons being displaced in response to fluid pressure from said source to actuate respective successive ones of said actuating members.

4. A moulding plant as defined in claim 1, comprising a source of fluid pressure, and wherein said closing means and said opening means comprise a single reciprocally displaceable piston, said single piston being displaced in response to fluid pressure from said source to actuate successive pairs of said actuating members.

5. A moulding plant as defined in claim 1, comprising a guide rail disposed adjacent a portion of said conveyor extending from said opening means to said closing means, said guide rail engaging said actuating members of respective one of said moulds in transit between said opening means and said closing means to retain said mould closure means of said moulds in transit in an open position.

6. A moulding plant as defined in claim 1, wherein each of said mould closure means further comprises, a pivotally mounted lever member, and a fulcrum member, said mould cover member being coupled to a first end portion of said lever member, said link member interconnecting the respective other end portion of said lever member and a first end portion of said actuating member, an intermediate portion of said lever member being pivotally connected to said fulcrum member, guide members on which said actuating member is slidably displaceable, said link member and said actuating member being mutually perpendicular when said mould is closed by said mould cover member.

7. A moulding plant as defined in claim 6, wherein said mould cover member is integral with said first end portion of said lever member.

8. A moulding plant as defined in claim 6, wherein said mould cover member is pivotally attached to said mould and said first end of said lever member is pivotally connected to said mould cover member.

9. A moulding plant as defined in claim 6, comprising further guide members along which said mould cover member is slidably displaceable in a direction substantially perpendicular to said mould.

10. A moulding plant as defined in claim 1, wherein each of said mould closure means comprises a mould cover member pivotally connected to the mould, a pair of pivotally mounted levers disposed on respective opposite sides of said mould and each pivotally connected to said mould, a pair of said link members linking respective ones of said pivotally mounted levers to said mould cover member, a first end portion of each of said link members being pivotally attached to said mould cover member and the respective other end portion of each of said link members being slidably coupled to respective ones of said pivotally mounted levers.

11. A moulding plant as defined in claim 10, wherein a substantially horizontal interface is defined between abutting surfaces of said mould cover member and said mould, and each of said pivotal connections between respective ones of said pivotally mounted levers and said mould is located below said interface.

12. A moulding plant as defined in claim 11, wherein a portion of at least one of said pivotally mounted levers projects below said pivotal connection between said pivotally mounted lever and said mould to form said actuating member of said mould closure means.

13. A moulding plant as defined in claim 10, comprising a pair of link pins respectively attached to said other end portions of respective ones of said link members, and wherein each of said pivotally mounted levers has an elongated slot formed therein, said link pins respectively engaging said elongated slots and being slidably displaceable therein.

14. A moulding plant as defined in claim 13, comprising adjusting screws engaging respective ones of said pivotally mounted levers to control the extent of said displacements of said link pins in respective ones of said elongated slots.

15. A moulding plant as defined in claim 10, wherein said pivotal connection between said mould cover member and said mould is displaceable with respect to said mould.

16. A moulding plant as defined in claim 11, wherein said pivotal connections between said link members and said mould cover member and said pivotal connections between said pivotally mounted levers and said mould are located in a central vertical plane of symmetry of said mould when said mould closure means is closed.

17. A moulding plant as defined in claim 1, comprising a plurality of hollow support members in each of which a respective one of said moulds is mounted, each of said support members comprising said mould closure means for the respective one of said moulds.

18. A moulding plant as defined in claim 1, comprising a plurality of first support members supporting respective ones of said moulds, and wherein each of said mould closure means further comprise a second support member pivotally connected to said first support member, said actuating member being pivotally attached to said second support member and said link member interconnecting a first end of said actuating member and said mould cover member, said mould cover member being displaced substantially perpendicularly of said mould when said actuating member is initially actuated.

19. A moulding plant as defined in claim 18, comprising a locking member pivotally connected to said second support member, a lug projecting from said first support member, a displaceable pin interconnecting said actuating member and said locking member, said locking member being displaced by said pin to unlock said first and second support members when said actuating member is initially actuated, and said second support member being pivotally displaced with respect to said first support member in response to further actuation of said actuating member.

References Cited

UNITED STATES PATENTS

| | | | |
|---|---|---|---|
| 2,014,468 | 9/1935 | Clayton | 18—4 C |
| 3,407,443 | 10/1968 | Beebee et al. | 18—4 PX |
| 3,541,645 | 11/1970 | Bunting | 18—20 C |
| 3,200,438 | 8/1965 | McIlvin | 18—4 P |
| 3,151,196 | 9/1964 | Tipton | 18—4 PX |

ROBERT L. SPICER, JR., Primary Examiner

U.S. Cl. X.R.

425—242, 450